May 7, 1957     W. R. BYRD     2,791,026
CHEESE SLICER
Filed Oct. 12, 1953
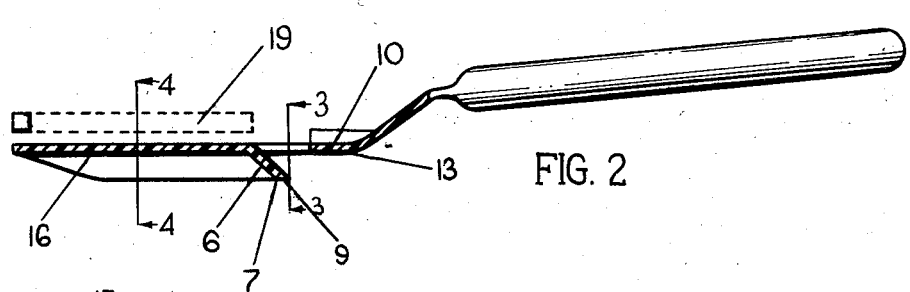
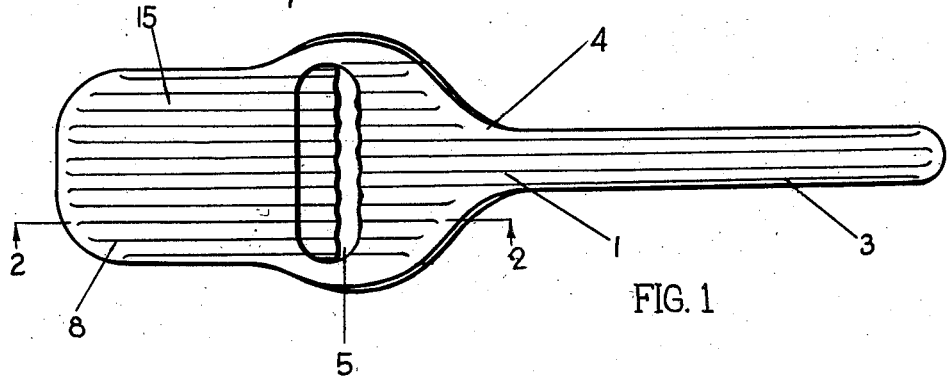
Inventor
William R. Byrd
By
Charles L. Loverchek
Attorney

2,791,026

CHEESE SLICER

William R. Byrd, Erie, Pa.

Application October 12, 1953, Serial No. 385,324

2 Claims. (Cl. 30—115)

This invention relates to cheese slicing devices and more particularly to a cheese slicer in combination with a spatula which will support the slice of cheese after slicing.

In devices for slicing cheese, made according to previous designs and with which I am familiar, the cheese slicer was made in such manner that it provided slices of cheese having very smooth surfaces which made it difficult to retain butter, mustard, and other spreads thereon. Further, the prior cheese slicers did not provide accurate gauging surfaces whereby uniform slices of cheese resulted. These prior cheese slicers were also very flexible and not adapted for manufacture from modern plastic material.

It is, accordingly, an object of my invention to overcome the above and other defects in prior cheese slicing devices and it is more particularly an object of my invention to provide a cheese slicer which is simple in construction, economical in manufacture, and simple to use.

Another object of this invention is to provide a novel combination of cheese slicing device and spatula.

Another object of the invention is to provide a novel cheese slicing device which will provide slices of cheese which are corrugated.

A further object of the invention is to provide a cheese slicing device which will provide slices of cheese of uniform thickness.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

Fig. 1. is a top view of the cheese slicing device according to my invention;

Fig. 2 is a cross sectional view taken on line 2—2 of Fig. 1;

Fig. 3 is a cross sectional view taken on line 3—3 of Fig. 2; and

Fig. 4 is a cross sectional view taken on line 4—4 of Fig. 2.

Now with more specific reference to the drawing, I show a cheese slicing device 1 having a body member 2 and a handle 3 attached thereto at 4. The handle 3 is preferably shaped ellipsoidal in cross section to conveniently fit the hand of the user. A laterally extending slot 5 is formed in the body member 2 and the blade 6 is formed and is struck out from the slot 5. The blade 6 has the surface 7 which may be generally parallel to the surface of the spatula blade 8. The cutting edge 9 is directed in a general direction parallel to the spatula portion 8. It will be noted that the cutting edge 9 is spaced from the surface 10 of the body member 2 intermediate the handle 3 and the body member 2 which serves as a gauge to insure that each piece of cheese is of the same thickness and that the handle 3 is held above the cheese to insure uniform thickness of the slices.

The cutting edge 9 as shown in Fig. 3 is wavy and has the downwardly extending waves 11 and the upwardly extending waves 12. The gauge surface 10 also has corrugations 13 which follow the corrugations made in the block of cheese during the previous cut, thereby forming uniform symmetrically shaped pieces of cheese. The spatula portion 8 also has corrugations 15 on top thereof and corrugations 16 underneath. The corrugations 15 on top of the spatula portion 8 support the slice of cheese after it is cut and the corrugations 16 on the bottom follow along in the corrugations made by the cut, thereby forming uniformly thick slices.

In use, the operator grasps the handle 3 and holds the spatula portion 8 parallel with the top of the block of cheese and allows the surface 10 to slide along the top surface thereof. The cutting edge 9 will engage the cheese and sever therefrom and the bottom corrugations will slide in the serrations left in the block of cheese by the previous cut while the corrugations on top of the blade 8 will guide the slice of cheese into a position at rest such as shown at 19.

Corrugated slices of cheese are found to be much more convenient to use in making sandwiches because sandwich spread or mustard can be disposed between the corrugations where ordinarily it is difficult to get the spread to remain on the cheese in uniform thickness of layer.

In the foregoing specification, I have set forth the invention in its preferred practical forms but I am aware that the structure shown is capable of modification within a range of equivalents without departing from the invention which is to be understood is broadly novel as is commensurate with the appended claims.

The embodiments of the invention in which an exclusive property or privilege is claimed are defined as follows:

1. A cheese slicing device comprising a generally flat spatula member made of relatively thin material, said spatula member comprising a relatively wide flat straight portion curving upwardly at one end, a handle attached to said upwardly curving end of said spatula member, said generally straight portion having a laterally extending slot therein disposed generally perpendicular to said handle and intermediate the ends of said flat portion of said spatula member a substantial distance from each end of said flat portion, a blade integrally attached to said spatula member at the edge of said slot remote from said handle and extending from said spatula member and toward said handle, and a cutting edge on said blade.

2. The cheese slicing device recited in claim 1 wherein said spatula member is corrugated and said corrugations extend longitudinally thereof, said blade being also corrugated and the corrugations thereof merging with the corrugations of said spatula member.

References Cited in the file of this patent

UNITED STATES PATENTS

| | | |
|---|---|---|
| 397,692 | Clark | Feb. 12, 1889 |
| 1,668,478 | Anderson | May 1, 1928 |
| 2,309,814 | Youngberg | Feb. 2, 1943 |
| 2,641,832 | Champlin | June 16, 1953 |

FOREIGN PATENTS

| | | |
|---|---|---|
| 142,098 | Switzerland | Nov. 1, 1930 |
| 541,007 | Germany | Jan. 4, 1932 |
| 55,730 | Norway | Oct. 7, 1935 |